US005821289A

United States Patent [19]
Congelio et al.

[11] Patent Number: 5,821,289
[45] Date of Patent: Oct. 13, 1998

[54] LOW VOLATILE ORGANIC SOLVENT BASED ADHESIVE

[75] Inventors: Carmen D. Congelio, Lorain; Andrew M. Olah, Spencer, both of Ohio

[73] Assignee: The B.F. Goodrich Company, Richfield, Ohio

[21] Appl. No.: 918,420

[22] Filed: Aug. 26, 1997

Related U.S. Application Data

[63] Continuation-in-part of Ser. No. 868,776, Jun. 4, 1997, which is a continuation-in-part of Ser. No. 684,117, Jul. 19, 1996.

[51] Int. Cl.[6] .......................... C08K 5/3445; C08K 5/03; C08K 5/11

[52] U.S. Cl. .......................... 524/104; 524/306; 524/314; 524/319; 524/321; 525/484; 525/486

[58] Field of Search .................................... 524/306, 314, 524/319, 321, 484, 486, 104

[56] References Cited

U.S. PATENT DOCUMENTS

| | | | |
|---|---|---|---|
| 2,616,868 | 11/1952 | Heisenberg | 524/98 |
| 3,406,136 | 10/1968 | Scarso et al. | 524/114 |
| 3,468,834 | 9/1969 | Oda et al. | 524/364 |
| 3,726,826 | 4/1973 | Knight | 524/113 |
| 3,765,983 | 10/1973 | Putzier | 156/293 |
| 3,984,499 | 10/1976 | Wardlow, Jr. et al. | 524/314 |
| 4,098,719 | 7/1978 | Hushebeck | 252/364 |
| 4,152,313 | 5/1979 | Fogle et al. | 524/104 |
| 4,197,355 | 4/1980 | Shepherd | 428/520 |
| 4,209,437 | 6/1980 | Fischer | 524/297 |
| 4,244,852 | 1/1981 | Prem et al. | 524/297 |
| 4,256,524 | 3/1981 | Hare | 156/220 |
| 4,351,756 | 9/1982 | Prem et al. | 524/314 |
| 4,365,079 | 12/1982 | Hsu et al. | 560/191 |
| 4,602,051 | 7/1986 | Nabeta et al. | 523/137 |
| 4,604,413 | 8/1986 | Nabeta et al. | 523/137 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,910,244 | 3/1990 | Dierdorf et al. | 524/179 |
| 5,077,331 | 12/1991 | Fahey et al. | 524/317 |
| 5,252,634 | 10/1993 | Patel et al. | 523/218 |
| 5,376,717 | 12/1994 | Patel et al. | 524/314 |
| 5,422,388 | 6/1995 | Patel et al. | 524/104 |
| 5,470,894 | 11/1995 | Patel et al. | 523/218 |
| 5,495,040 | 2/1996 | Patel et al. | 560/190 |

FOREIGN PATENT DOCUMENTS

| | | |
|---|---|---|
| 646301 | 2/1994 | Australia . |
| 0046957 | 3/1982 | European Pat. Off. . |
| 0183112 | 6/1986 | European Pat. Off. . |
| 0370844 | 5/1990 | European Pat. Off. . |
| 0489485 | 6/1992 | European Pat. Off. . |
| 0547593 | 6/1993 | European Pat. Off. . |
| 49-11931 | 2/1974 | Japan . |
| 53-88042 | 8/1978 | Japan . |
| 54-111543 | 8/1979 | Japan . |
| 59-187067 | 10/1984 | Japan . |
| 711059 | 1/1980 | U.S.S.R. . |
| 1036489 | 7/1966 | United Kingdom . |
| 1090932 | 11/1967 | United Kingdom . |
| 1582500 | 1/1981 | United Kingdom . |
| WO 93/16130 | 8/1993 | WIPO . |

OTHER PUBLICATIONS

ASTM Designation: D1599–88, "Standard Test Method for Short–Time Hydraulic Pressure of Plastic Pipe, Tubing, and Fittings", pp. 26–27.
ASTM Designation: D1784–92, "Standard Specification for Rigid Poly(Vinyl Chloride) (PVC) Compounds and Chlorinated Poly(Vinyl Chloride) (CPVC) Compounds", pp. 47–50.
ASTM Designation: D2235–93a, "Standard Specification for Solvent Cement for Acrylonitrile–Butadiene–Styrene (ABS) Plastic Pipe and Fittings", pp. 83–87.
ASTM Designation: D2564–93, "Standard Specification for Solvent Cements for Ply(Vinyl Chloride) (PVC) Plastic Piping Systems", pp. 209–212.
ASTM Designation: F493–93a, "Standard Specification for solvent Cements for Chlorinated Poly(Vinyl Chloride) (CPVC) Plastic Pipe and Fittings", pp. 820–824.
Material Safety Data Sheet, DuPont Chemicals, "DBE", Jan. 19, 1994, pp. 1–7.
Material Safety Data Sheet, DuPont, "DBE Solvent", Mar. 30, 1994, pp. 1–8.
DuPont Publications, Wilmington, DE, "DuPont DBE Solvent is Cleaning with Care".
DuPont Nylon, "Dibasic Esters (DBE)", Jun. 1993.
DuPont Chemicals, "DBE Solvent Applications DBE–Based Industrial Cleaning Solvents and paint Strippers".
DuPont Publication, May/Jun. 1994, "The DBE Difference", pp. 14–15.
*Chemical & Engineering*, Elisabeth M. Kirshner, "Environment, Health Concerns Force Shift in Use of Organic Solvents", Jun. 20, 1994, pp. 13–20.
*Adhesives Age*, John E. Cuzic, "Chlorinated Solvents Offer Performance and Low VOC", Jul. 1989, pp. 26–28.

(List continued on next page.)

*Primary Examiner*—Peter A. Szekely
*Attorney, Agent, or Firm*—Helen A. Odar

[57] ABSTRACT

The present invention relates to a low VOC solvent based adhesive comprising a mixture of at least two organic solvents and a thermoplastic resin. Desirably the adhesive has a flash point of at least 100° F. when measured in accordance with ASTM D3828-87. The solvent blend of the low VOC solvent based adhesive of the instant invention volatilizes at substantially reduced rates as compared to conventional solvent blends in solvent based adhesives. Furthermore, this novel low VOC solvent based adhesive is easy to apply, cost effective, and cures within a reasonable time without the use of heat, ultraviolet light or other mechanical devices. In addition, the novel low VOC solvent based adhesive has good storage stability in metal or non-metal containers.

27 Claims, No Drawings

OTHER PUBLICATIONS

J. Adhesion, C.Y. Yue, "Influence of the bonding Solvent on the Structure and Strength of Solvent Welded Joints", 1986, vol. 20, pp. 99–116.

American Waterworks Association Conference 1981 pt. 2 PWACDO, K.D. Reich et al, "Diffusion of Organics from Solvent Bonded Plastic Pipes Used for Potable Water Plumbing", Jun. 16, 1994, pp. 1249–1260.

International Journal Adhesion and Adhesives, vol. 8, No. 1, Jan. 1988, C.Y. Yue, "The Structure and Srength of Solvents Welds Between Dissimilar Amorphous Thermoplastics", pp. 47–53.

Plastics and Rubber Processing and Applications, vol. 12, No. 2, 1989, C.Y. Yue et al., "The Failure Mechanisms in and the Durability of Solvent Welded Pipeline Systems", pp. 105–112.

South Coast Air Quality Management District, Rule 1168, Dec. 4, 1992, pp. 1168–1–1168–16.

South Coast Air Quality Management District, Applied Science & Technology Laboratory Services, SCAQMD Method 316A–92, "Determination of Volatile Organic Compounds (VOC) in Materials Used for Pipes and Fittings", Revised Apr. 1995 (Draft), pp. 1–5.

Journal of Vinyl Technology, Dec. 1984, vol., 6, No. 4, Emilia Lacatus et al., "Stress Cracking of Rigid Polyvinyl Chloride by Plasticizer Migration", pp. 157–161.

Underwriters Laboratories Inc., Standard for Safety UL 1821, "Thermoplastic Sprinkler Pipe and Fittings for Fire Protection Service", Dec. 29, 1994.

LOW VOLATILE ORGANIC SOLVENT BASED ADHESIVE

CROSS REFERENCE

This application is a continuation-in-part of U.S. patent application Ser. No. 08/868,776 filed Jun. 4, 1997 which is a continuation-in-part of U.S. patent application Ser. No. 08/684,117 filed Jul. 19, 1996.

FIELD OF THE INVENTION

This invention relates to a low volatile organic (VOC) solvent based adhesive. In particular, the invention relates to a low VOC solvent based adhesive which is capable of joining two thermoplastic materials together. Furthermore, the invention relates to a low VOC solvent based adhesive having a solvent which volatilizes at a substantially reduced rate as compared to those solvents of conventional solvent based adhesives for thermoplastic materials. Additionally, the invention relates to a low volatile organic solvent based adhesive having a flash point substantially above 100° F. as determined by the test method set forth in the ASTM D 3828-87. Preferably, the invention comprises a low VOC solvent based adhesive used to join two objects or articles made from chlorinated polyvinyl chloride (CPVC). A preferred solvent is naphthalene having one or more alkyl groups thereon and a total of 11 to 14 carbon atoms and/or benzene having 1 or more alkyl groups thereon and a total of 10 to 14 carbon atoms.

BACKGROUND OF THE INVENTION

Solvent based adhesives have been used extensively to join thermoplastic pipe and fittings for numerous years. These solvent based adhesives provide for a convenient way to join thermoplastic materials relatively easily and quickly. Often, thermoplastic pipe and fittings joined in this manner can even be tested the same day.

Generally, the solvent based adhesives comprise a mixture of solvents as well as resin and other additives such as thixotropic agents. The solvent based adhesive dissolves the surface layer of the thermoplastic material to which it is applied, causing it to swell. The resin in the adhesive solution accelerates the setting of the two materials to be joined, fills any voids, as well as reduces the internal stresses. The adhesive cures by evaporation. The primary solvents used in conventional solvent based adhesives include tetrahydrofuran, methyl ethyl ketone and cyclohexanone. These solvents are very volatile and consequently adhesives made therefrom have VOC levels in the range of 750 to 850 g/l as measured by the South Coast Air Quality Management District (SCAQMD) 316A.

Furthermore, prior to the application of these conventional solvent based adhesives, the thermoplastic material desirably is prepared with either a primer such as tetrahydrofuran or a cleaner such as acetone, in order to minimize adhesive failure. In this cleaning process even more volatile organic compounds are released into the atmosphere. In addition, since these conventional solvent based adhesives are largely formed from solvents, the solvent tends to spread to a large area and drip during their application to the thermoplastic materials, causing additional volatization. Moreover, conventional solvent based adhesives and/or primers for adhesives generally have low flash points. The low flash point requires special precautions in the handling and packaging to avoid combustion of these adhesives and/or primers. Evaporation of solvents from solvent based adhesives provides for an air pollution problem.

Due to the environmental awareness occurring today, laws and regulations are being enacted to limit the amount of VOC levels in all materials, in particular solvent based adhesives. In California, for example, the South Coast Air Quality Management District (SCAQMD) has set regulations limiting the VOC levels of materials used to join thermoplastic materials. For example, pursuant to Rule 1168 of SCAQMD, the VOC limits for CPVC and/or polyvinyl chloride (PVC) solvent based adhesives, effective Jan. 1, 1994 were 450 grams/liter as measured by SCAQMD 316A. The VOC limits for acrylonitrile styrene butadiene (ABS) solvent based adhesives were 350 grams/liter as of Jan. 1, 1994 as measured by SCAQMD 31 6A. Further legislation has reduced these limits even further. Future proposed regulations, the SCAQMD VOC limits for CPVC and PVC solvent based adhesives will be 250 grams/liter whereas the SCAQMD VOC limits for ABS solvent based adhesives will remain at 350 grams/liter.

Several adhesives have been formulated which contain lower VOC levels than the conventional solvent based systems. The VOC levels of conventional solvent based adhesive systems was generally about 650 grams/liter as measured by SCAQMD 316A prior to 1994. For example, Australian Patent Application 86750/91 discloses an adhesive comprising more than 80 weight percent of n-methyl-2-pyrrolidone, more than 0.25 weight percent of a viscosity modifier and more than 10 weight percent of a vinyl based polymer. The viscosity modifier can be silica, a thickening agent or a thixotropic agent. Similarly, U.S. Pat. No. 4,675, 354 discloses a glue solution which comprises a solution of a water insoluble synthetic organic polymer in a solvent such as N-methyl-2-pyrrolidone. This glue solution may be used at tropical temperatures without problems arising from solvent vapors and fire risks.

Also, U.S. Pat. No. 4,687,798 discloses a solvent cement used for joining water insoluble polymers. The solvent cement comprises about 10–15 weight percent of a water insoluble polymer and a solvent. The solvent comprises ethyl acetate and N-methyl-2-pyrrolidone. The ethyl acetate ranges from about 3 percent to about 50 percent by weight of the solvent with the balance being N-methyl-2-pyrrolidone.

In addition, European Patent Application 0 547 593 Al discloses a low VOC adhesive composition. The composition of this European Patent Application comprises a mixture of from 5 weight percent to about 60 weight percent of at least one water insoluble polymer, from about 1 weight percent to about 30 weight percent of inorganic or synthetic resinous hollow microspheres and from about 20 weight percent to about 70 weight percent of at least one volatile organic liquid which is a solvent for the water insoluble polymer.

U.S. Pat. No. 5,470,894 to Patel et.al., provides for an additional example of a low VOC solvent based adhesive. The low VOC solvent based adhesive in this patent is used to join CPVC pipes. The adhesive comprises a high vapor pressure solvent comprising from about 15 to about 35 weight percent of tetrahydrofuran and 0 to about 30 weight percent of methyl ethyl ketone; a low vapor pressure solvent comprising about 20 to about 45 weight percent cyclohexanone, 0 to about 30 weight percent of N-methyl pyrrolidone and from 0 to 10 weight percent of dibasic esters. Patel, et. al. state that the VOC level of their adhesive is at or below 450 grams/liter, while the adhesive meets or exceeds the required performance standards such as hydrostatic burst strength and hydrostatic sustained pressure tests.

Nonetheless, there is still an environmental concern with using any one of the above enumerated adhesives. There are however, alternatives to solvent based adhesives. These are mechanical, reactive, or thermal systems. Mechanical joining systems are generally very expensive to use. Examples of mechanical joining systems include Acorn Fittings from Hepworth Building Products; PolyGrip Fittings from Philmac Corporation and Uncopper Fittings from Genova. Thermal systems are unpredictable due to the difficulty in consistently producing adequate pipe/fitting unions. Examples of thermal systems include hot melt glues available from the Minnesota, Mining and Manufacturing Company. These thermal systems are difficult to apply and perform less consistently than solvent based adhesives. An example of a reactive system includes epoxy. Epoxy is available from the Noble Corporation under the tradename Copper Bond. Other examples of an epoxy include General Purpose Urethane, High Shear Strength Urethane and All Purpose Epoxy, all available from the Hardman Corporation. However, these reactive systems are problematic because they have long cure times and poor green strength. Their efficacy is also temperature dependent; at low temperatures epoxy materials have very long cure times. Furthermore, there may be by products of the chemical reactions which may be detrimental to the strength of the pipe. Even though these alternatives exist, they are cost prohibitive, time consuming and cumbersome.

Despite some of the air quality problems, there are benefits to continuing to use the solvent based adhesives to join thermoplastic materials. First, solvent based adhesives are easy to use and many workers have years of experience using these types of adhesive systems. Second, there are low production costs in making the solvent based adhesives as well as long term durability once the adhesives are used to join the two thermoplastic materials. Further, the solvent based adhesives can be used on location to join the two thermoplastic materials together without any additional equipment. Fourth, the solvent based adhesive system cures pretty rapidly, allowing for testing. In addition, one technique can be used to apply the solvent system for all sizes of pipe. Generally, the solvent based adhesive system can be applied to the joint at any temperature in the range of 0° to 120° F., if the solvent based adhesive system meets the Underwriter's Laboratories Test 1821. Also, the solvent based adhesive systems do not rely upon a chemical reaction for their efficacy. Moreover, the solvent based adhesive system can possibly be stored long term at ambient temperatures. Therefore, overall the solvent based adhesive systems are generally practical and economical.

Thus, there currently exists a need for a low VOC solvent based adhesive which has adequate shelf and storage life. Furthermore, there exists a need for a low VOC solvent based adhesive that meets the required performance criteria necessary to join two thermoplastic materials together. Additionally, there exists a need for a low VOC solvent based system with higher flash points than conventional solvent based adhesives and/or primers for adhesives.

SUMMARY OF THE INVENTION

The present invention comprises a novel low VOC solvent based adhesive comprising a mixture of two or more volatile organic solvents and a resin. Optionally, the novel low VOC solvent based adhesive may contain a thixotropic agent such as silica. Preferably, the novel low VOC solvent based adhesive comprises about 5–15 weight percent thermoplastic resin; about 38–65 70 or 75 weight percent of substituted naphthalenes and/or substituted benzenes with 1 or more alkyl groups and/or N-methyl-2-pyrrolidone; about 20–45 weight percent dimethyl adipate and optionally 1.5–2% of silica based upon the weight of said solvent based adhesive. Most preferably, this novel low VOC solvent based adhesive has a flash point above 100° F. as measured in accordance with ASTM D 3828-87.

In a further embodiment of the invention, the invention comprises a novel low VOC solvent based adhesive having a flash point substantially greater than 100° F. as measured by ASTM D 3828-87. Preferably, novel low VOC solvent based adhesive comprises about 5–15 weight percent thermoplastic resin, about 38–65, 70 or 75 weight percent of n-methyl-2-pyrrolidone and/or an alkyl substituted naphthalene and/or substituted benzene with 10–14 carbon atoms about 15 or 20–45% dimethyl adipate; optionally about 1.5–2% of silica and optionally about 5–10% of a ketone having a flash point greater than 70° F. and more desirably above 100° F. Preferably, the ketone is either 5-methyl-2-hexanone (methyl-iso-amyl ketone) or 4-methyl-2-pentanone (methyl isobutyl ketone), or combinations thereof.

The low VOC solvent based adhesive of the instant invention has a VOC level of less than 450 grams/liter as measured by SCAQMD 316A. Preferably, the novel low VOC solvent based adhesive has a VOC level of less than 350 grams/liter and preferably less than 250 grams/liter as measured by SCAQMD 316A.

DETAILED DESCRIPTION OF THE INVENTION

The low VOC solvent based adhesives of the instant invention comprises a mixture of two or more volatile organic liquid solvents which are capable of vaporizing at ambient temperatures as well as a thermoplastic resin. Furthermore, the low VOC solvent based adhesives of the instant invention desirably have a flash point greater than 100° F. as measured by ASTM D 3828-87. Adhesives having a flash point above 100° F. may, according to U.S. Department of Transportation rules, be eligible for storage and shipping in less expensive plastic (e.g. polyolefin) containers while similar adhesives with lower flash points require more expensive metal containers. Other ingredients, including other solvents, fillers, thixotropic agents or stabilizers may be added to the low VOC solvent adhesive as desired. The low VOC solvent based adhesives as described herein in further detail generally have the following characteristics: viscosity from 500–3000 centipoise; a green strength in about 1–2 or 3 minutes; less than 20% solids in the adhesive, an indefinite shelf life in nonreactive containers and a variable cure time. The cure time can be varied for different end-use needs by minor adjustments of the solvent ratios used.

The first, second, and optional additional solvents are mixed in proportions (as taught later in the specification) such that the total volatile organic content as measured by South Coast Air Quality Management District (SCAQMD) Test Method 316A is below 450 grams/liter, more desirably less than 400 g/l, still more desirably less than 350 or 300 g/l, and preferably less than 250 g/l. In an embodiment the total volatile organic content is desirably from about 50 or 100 to about 150, 200, or 250 g/l. As the SCAQMD is considering amending their limits to exclude the weight percent volatilized acetone from their reported volatile organic content for Test Method 316A, the above ranges of volatile organic contents are set forth as optionally excluding the contribution of any volatile organics due to acetone in the solvent based adhesive.

Alkyl substituted naphthalenes and/or substituted benzenes with 1 or more alkyl groups, as disclosed below, were found to be an effective substitute for NMP in these adhesives. Therefore in some embodiments it is desirable to have less than 10 wt. %, more desirably less than 5 wt. % and preferably less than 1 wt. % NMP based upon the weight of the solvent based adhesive.

The flash point of a material is used as one of the properties that is considered assessing the overall flammability of a material. One method to determine a flash point of a material is ASTM D 3828-87, which is incorporated herein in its entirety. Flash points are used in safety and shipping regulations such as CFR §173.120 and §173.150 to define both flammable and combustible materials. These regulations specify the types of packaging required for these materials. If a material has a higher flash point, the packaging and its shipping requirements may not be as stringent as those generally required for solvent cements and/or primers.

The thermoplastic resins that can be used in the formulation of the low VOC solvent based adhesive of the instant invention include polyvinyl chloride (PVC), chlorinated polyvinyl chloride (CPVC), poly(acrylonitrile-butadiene-styrene) (ABS), polystyrene, and any other amorphous thermoplastic resins which are soluble in the mixture of the two or more volatile organic solvents. Generally, the resin used in the solvent based adhesive of the instant invention is the same as the resin used to form the thermoplastic materials to be joined. Preferably, the resin is either CPVC, PVC or ABS. Examples of possible ABS resins to be used include the Cycolac ABS resins from GE Plastics and the Lustran ABS resins from Monsanto. Most preferably, the resin is CPVC. The amount of thermoplastic resin added to the low VOC solvent based adhesive desirably ranges from about 5 to about 15 or 20 weight percent and more preferably from about 10 to about 13.5 or 15 weight percent.

The CPVC and/or PVC resin should have an inherent viscosity in the range of about 0.6 to about 0.96. Preferably, the chlorination levels for the CPVC resins should range from about 58 to about 72 weight percent. Preferably, the chlorination level for the PVC resin should be less than 57%. Generally, the CPVC resin used is CPVC resin as defined in Class 23477 of the ASTM D1784. However, the molecular weight of the CPVC resin should not be below 0.68 IV (inherent viscosity). Examples of suitable CPVC to be used in the instant invention include TempRite 674×571 CPVC, a preferred compound and TempRite 677×670 CPVC, all available from The B. F. Goodrich Company. (TempRite is a registered trademark of The B. F. Goodrich Company).

In addition to the thermoplastic resin, the low VOC solvent based adhesive of the instant invention includes a mixture of two or more volatile organic liquid solvents that are capable of vaporizing at ambient temperatures. The first organic solvent(s) that is used in the mixture is a low vapor pressure solvent. Alkyl substituted naphthalenes having one or more alkyl groups and a total of 11 to 14 carbon atoms and/or one or more alkyl substituted benzenes with 1 or more alkyl groups and a total of 10 to 14 carbon atoms and/or N-methyl-2-pyrrolidone ("NMP") are the most preferred low vapor pressure solvents. The preferred benzenes have 2 or more, 3 or more and 4 or more alkyl groups. NMP is commercially available from Aldrich Chemical, Ashland, BASF, Chemoxy International and Janssen Chemical. The alkyl substituted naphthalenes and substituted benzenes having 1 or more alkyl groups are available from petroleum distillation as isolatable fractions. They are available from Koch Specialty Chemical Group, Corpus Christi, Tex. either under a chemical name e.g. methyl naphthalene or as a specific Sure Sol® product (used primarily for alkyl substituted benzenes). They are generally classified as specialty chemicals while benzene, xylene, toluene, cumene, and ethylbenzene are generally classified as commodity chemicals. The first organic liquid solvent is generally found in the novel adhesive in the range of from about 38 to about 70 or 75 weight percent, and more desirably from 38 to about 65 weight percent. In one embodiment, 50 percent of NMP is present in the low VOC solvent based adhesive.

This application differs from the previous two related applications in that desirably at least a portion of about 38 to about 65, 70, or 75 weight percent low vapor pressure solvent, more specifically at least 5 weight percent based upon the solvent based adhesive, comprises said one or more alkyl substituted naphthalenes or substituted benzenes with 1 or more alkyl groups or combinations thereof, more desirably from about 20 to about 65, 70 or 75 weight percent of the adhesive and preferably from about 38 or 50 to about 65, 70, or 75 weight percent.

Additional other solvents other than said NMP, alkyl substituted naphthalene and alkyl substituted benzene may be present in amounts from about 5 to about 47 weight percent, more desirably from about 15, 20 or 25 to about 45 or 47 weight percent based upon said solvent based adhesive. Said additional solvents can include a second and optionally a third or more solvent.

The second organic liquid solvent in the solvent based adhesive is chosen from the group comprising polycarboxylic acids desirably having from 4 to 15 carbon atoms; their mono, di alkyl esters desirably having from 4 to 19 carbon atoms such as pimelic acid, monomethyl glutarate, monomethyl pimelate, monomethyl azelate, monomethyl sebacate, monoethyl adipate, dimethyl succinate, dimethyl glutarate, dimethyl adipate, dimethyl pimelate, dimethyl substrate, and dimethyl azelate; or chlorides of polycarboxylic acids desirably having from 4 to 15 carbon atoms such as glutaryl chloride, adipoyl chloride, and pimeloyl chloride; and alkyl chlorides of said polycarboxylic acids having from 4 to 17 carbon atoms such as methyl adipoyl chloride and methyl primeloyl chloride etc.; or mixtures thereof. For example, mixtures of dimethyl glutarate, dimethyl adipate and dimethyl succinate can be used. A commercially available example of such a mixture is DBE-9, available from DuPont Chemical. The most preferred second organic solvent is dimethyl adipate ("DMA"). DMA is available from the DuPont Company under the tradename DBE-6. The DBE-6 is believed to be a mixture comprising 98.7% DMA, <0.5% dimethyl glutarate, and <0.1% dimethyl succinate. It is desirable that the esters of polycarboxylic acids and alkyl alcohols and/or chlorides of polycarboxylic acids be present in amounts from about 10 to about 35 weight percent and more desirably from about 25 to about 35 weight percent based upon the weight of the adhesive. In other embodiments the second organic solvent is desirably found in the range of about 20% to about 45% in the solvent mixture. In the most preferred embodiment, 27% of the DMA is used in the low VOC solvent based adhesive mixture.

The low VOC solvent based adhesive also may include other optional ingredients. For example, the low VOC solvent based adhesive of the present invention may include minor amounts of other optional solvents which do not raise the VOC level of the adhesive above 450 grams/liter and which are miscible with the mixture of the two or more volatile liquid organic solvents. Examples of possible solvents which can be used include cyclic or linear ketones, esters of monocarboxylic acids and alkyl alcohols, halogenated solvents, ethers, and other liquids such as dimethylformanide (DMF) and dimethyl sulfoxide (DMSO).

Ketones which can be used in the instant invention as additional solvents include acetone, methyl ethyl ketone (MEK), methyl-iso-amyl ketone, methyl-iso-butyl ketone, isophorone, cyclohexanone and other ketones of 3 to 15 carbon atoms. Desirably these ketones are present in amounts of 15 weight percent or less more desirably from about 5 to about 10 weight percent based on the solvent based adhesive. Desirably the additional one or more solvents and especially the ketones all have a flash point of above 70° F. or 100° F. by ASTM D 3828-87. In one embodiment desirably all the additional one or more solvents and especially the ketones consist essentially solvents, e.g. ketones having a flash point above 70° or 100° F. The important criteria is that all the ketones when mixed as a ketone blend will desirably have a flash point above the specified value. In another embodiment desirably the amount of solvents, e.g. ketones having a flash point below 50° F. is limited to less than 5 weight percent.

Examples of esters of monocarboxylic acids having from 2 to 15 carbon atoms and alkyl alcohols having from 1 to 15 carbon atoms which can be used in the instant invention include methyl acetate, ethyl acetate (EA), ethyl formate, ethyl propionate, and butyl acetate. Halogenated solvents which can be used include methylene chloride, ethylene dichloride and trichloroethylene. An ether derived from methyl cellulose is an example of a possible ether having from 3 to 15 carbon atoms which can be added as an additional solvent. Other possible liquids which can be utilized as additional solvents include tetrahydrofuran and any other high vapor pressure solvent provided that the other criteria, including but not limited to green strength and desired flash points enumerated above are met. Generally, these other liquids are added to obtain faster cure times or volatilization.

Fillers which are known in the art and any other materials which can function as inert fillers can be used in the instant invention. Examples of fillers which can optionally be used in the instant invention include hollow spheres (glass or ceramic), polymers, glass spheres, magnesium silicate, magnesium oxide, shell flour, alumina, talc, barium sulfate, calcium carbonate, and other fine powder. These fillers are generally added in the amount of about 0.05 to 20 weight percent to the composition. Fillers can be added to reduce the cost, maintain the viscosity or reduce the VOC slightly. Preferred fillers include polymers and calcium carbonate.

The low VOC solvent based adhesive also may include optionally thixotropic agents in the composition. Examples of possible thixotropic agents which can be used include fumed silica, precipitated silica, bentonite clay, ground quartz, mica, ethyl cellulose, hydrogenated castor oil, organic modified clay, other thickeners or viscosity adjustors. Preferred thixotropic agents include fumed silica. Generally, the amount of thixotropic agent used, if used at all, is in the range of about 1 to about 3%, more desirably from about 1.5 to about 2% by weight based on the weight of the solvent based adhesive.

Further, pigments, dyes, dispersions or colorants may be added to the low VOC solvent based adhesive. Examples of possible pigments which can be used include titanium dioxide, calcium carbonate or carbon black. The amount of pigment used is generally in the range of 0.05% to about 5.0% by weight based upon the weight of the solvent based adhesive.

The low VOC solvent based adhesive may include other additives. This includes any additives known to those in the art. Suitable additives include for example but not limited to various stabilizers, antioxidants, electrostatic dissipative agents, smoke retardants, moisture scavengers, and acid scavengers. Since several additives can be combined in countless variations, the total amount of additive can vary from application to application. Optimization of the particular additive composition can be determined easily by one of ordinary skill in the art. Generally from about 0.5% to about 1.0% by weight of additives are added based upon the weight of the low VOC solvent based adhesive.

The ingredients for the low VOC solvent based adhesive can be combined in any convenient manner. For example, all the ingredients can be mixed together uniformly by mixing means such as a mixer. Preferably, the two solvents are first mixed together. No special sequence or order is necessary. The thermoplastic resin and the thixotropic agent are then added to the solvent mixture; no special order is required. A stir mixer such as Grenier Mixer, Model 3002 with fast agitation is used to dissolve the solids in the solvent quickly. The mixer was set at 400–500 rpm for about 10–15 minutes. The mixture may then be placed on a slower moving roller mixer to evenly blend the composition. An example of a possible roll mixer which can be used is the Paul O. Abbe Ball Mill. The mixture was placed in this Ball Mill for one hour at 160 rpm.

The low VOC solvent based adhesive can be applied by any method of application to the two objects made from thermoplastic materials that are going to be joined. Although not necessarily, prior to the application of the low VOC solvent based adhesive of this invention, the surfaces of the objects to be joined are lightly wiped with a brush or cloth containing acetone or other solvent near the point of the desired joint. The low VOC solvent based adhesive can be applied by any method known in the art. Preferably, the low VOC solvent based adhesive is applied by a dauber to the two surfaces of the objects made from the thermoplastic materials, near the area of the desired joint. A uniform layer of adhesive is placed upon the two surfaces. Generally, a layer of approximately ½ to 1 mil (0.01 mm–0.025 mm) thickness is placed upon the two surfaces. Then joint can be assembled, allowed to cure and then be tested.

There are many uses of the low VOC solvent based adhesives of the instant invention. For example, the low VOC solvent based adhesive can be used to join thermoplastic pipe and fittings in various applications such as plumbing systems, cold and hot water distribution systems, sprinkler systems, spas, fire sprinkler systems, drain, waste and vent applications. The low VOC solvent based adhesive is useful for any other thermoplastic materials that can be joined. Preferred thermoplastic pipe materials are CPVC, PVC, ABS, and polystyrene. While the solvent based adhesive is formulated as a one component adhesive, i.e. not requiring a primer or solvent pretreatment, primers or solvent pretreatments e.g. acetone cleaning of ABS pipe may improve performance in some tests. Typically inclusion a small portion of pretreatment solvents recommended for each pipe type e.g. acetone for ABS, into the solvent based adhesive may improve performance. The following non-limiting examples serve to further illustrate the present invention in greater detail.

EXAMPLES

In the following examples in Tables 1–5, an NMP based low VOC solvent adhesive was formulated. Generally, as a first step, a desired level for the VOC solvent based adhesive was determined. The desired VOC level is determined by the selection of the two solvents. Using SCAQMD 316A, the VOC constant for each of the solvents to be used in the low VOC solvent based adhesive was determined experimentally. The estimated VOC for the solvent based adhesive can then determine using the following equation: (VOC constant of solvent 1×% of solvent 1 based upon total amount of solvents in the adhesive)+(VOC constant of solvent 2×% of solvent 2 in adhesive based upon total amount of solvents) +similar calculations for additional solvents=estimated VOC level of the adhesive. Once this desired VOC constant was determined, the low VOC solvent based adhesive was formulated and the VOC level verified using SCAQMD 316A. The viscosity of the solvent cement was optimized via the addition of thixotropic agents. The green strength and the cure time were varied by adjustments of the solvent ratios while still maintaining a desired VOC level and viscosity.

The cure time may be varied to adjust for end-use needs. In the first examples (Tables 1–5), the amount of the NMP and dimethyl adipate (DMA) was varied. The following examples were all tested for the VOC level, the cure time, the green strength and quick burst. The VOC level is measured using the test in SCAQMD 316A; the quick burst is measured using ASTM 1599 and the cure time is measured using Underwriters Laboratories UL 1821.

The green strength is tested by a procedure whereby the tester tries to pull or twist apart the bonded pipe and fitting. In carrying out the procedure, the inner part of the thermoplastic fitting and the outer part of the thermoplastic pipe (which fits in the fitting) are each coated with the same adhesive. At the end of one minute, the tester tries to pull or twist apart the two pieces. Generally, the bonded pipe and fitting are subjected to 6 foot-lbs. of torque during the test. If the two pieces do not come apart, this constitutes a "yes" which means that the experiment is repeated until a "no" is obtained. Each time the experiment is redone, one additional minute is added to the previous time. The time that a "no" is reached, indicates the green strength. The formulations as well as the results are set forth in Table 1. The pipe used to generate the data in the tables, unless otherwise specified was SDR-11 also known as ¾ inch tubing having an outside diameter of 0.875–0.878 and a wall thickness of 0.080–0.100 inch.

Examples of commercial solvent cements with which the instant invention is compared and contrasted with include Orange Lo V.O.C. Medium Booked CPVC Cement (one step) and two steps cements available from Oatey; as well as the Weld-On CPVC 2714® Orange Heavy Booked Cement (one step) and two step cements from IPS. Generally, the one step commercial solvent cements have a VOC level of about 450 grams/liter, whereas the two step cements have a VOC level greater than 650 grams/liter.

TABLE 1

| Ex. | DMA | NMP | Silica | TempRite 674 × 571 CPVC | VOC (g/l) | Green Strength (min.) | Viscosity (cp) | Quick Burst (psi) | DMA/ NMP Ratio |
|---|---|---|---|---|---|---|---|---|---|
| 1 | 20 | 65 | 2 | 13 | 154 | 2 | 1445 | >1400 | 0.31 |
| 2 | 30 | 55 | 2 | 13 | 143 | 1 | 2585 | >1400 | 0.55 |
| 3 | 40 | 45 | 2 | 13 | 164 | 1 | 9285 | >1400 | 0.89 |
| 4 | 45 | 40 | 2 | 13 | 128 | 1 | 69950 | >1400 | 1.125 |
| COMMERCIAL SOLVENT CEMENTS | | | | | >400 | 1–2 | 500–3000 | PIPE or >1400 FAILURE | |

Examples 1 through 4 in Table 1 illustrate that solvent based adhesive formulations having DMA/NMP ratio of from 0.31 to 1.125 have a lower VOC level than standard solvent cement formulations. Examples 3 and 4 would be unacceptable for commercial use due to the high viscosity although still effective as an adhesive.

TABLE 2

| EX. | DMA | NMP | Silica | TempRite 674 × 571 CPVC | Cyclo-hexa-none | MEK | THF | EA[1] | MeOH | VOC (g/l) | DMA/ NMP Ratios | Green Strength (min.) | Viscosity (cp) | Quick Burst (psi) |
|---|---|---|---|---|---|---|---|---|---|---|---|---|---|---|
| 5 | 20 | 60 | 1 | 13 | | | | | 6 | 278 | 0.33 | 2 | 1940 | >1400 |
| 6 | 20 | 60 | 1 | 13 | 6 | | | | | 274 | 0.33 | 2 | 1672 | 785 PF[2] |
| 7 | 26 | 55 | 1 | 13 | | | 5 | | | 267 | 0.47 | 3 | 1872 | 825 PF |
| 8 | 25 | 55 | 1 | 13 | 2 | 2 | 2 | | | 261 | 0.45 | 2 | 2136 | 850 PF |
| 9 | 26 | 55 | 1 | 13 | 5 | | | | | 268 | 0.47 | 1 | 1485 | >1400 |
| 10 | 26 | 55 | 1 | 13 | | 5 | | | | 239 | 0.47 | 2 | 1130 | >1400 |
| 11 | 30 | 50 | 2 | 13 | | | 5 | | | 250 | 0.60 | 2 | 2996 | 743 PF |
| 12 | 30 | 50 | 2 | 13 | | 5 | | | | 278 | 0.60 | 2 | 2992 | 938 PF |
| 13 | 30 | 50 | 2 | 13 | 5 | | | | | 283 | 0.60 | 1 | 2830 | >1400 |
| 14 | 30 | 50 | 2 | 13 | | | | 5 | | 250 | 0.60 | 2 | 2810 | >1400 |
| 15 | 45 | 35 | 2 | 13 | | | | 5 | | 293 | 1.29 | 3 | 54000 | 938 PF |
| 16 | 45 | 35 | 2 | 13 | | 5 | | | | 257 | 1.29 | 2 | 11140 | 900 PF |
| 17 | 45 | 35 | 2 | 13 | 5 | | | | | 232 | 1.29 | 3 | 10020 | 935 PF |
| 18 | 45 | 35 | 2 | 13 | | | 5 | | | 253 | 1.29 | 12 | 78700 | >1700 PF |
| 19 | 20 | 60 | 1 | 13 | | | | | 6 | 363 | 0.33 | 2 | 604 | >1400 |

TABLE 2-continued

| EX. | DMA | NMP | Silica | TempRite 674 x 571 CPVC | Cyclo-hexa-none | MEK | THF | EA[1] | MeOH | VOC (g/l) | DMA/ NMP Ratios | Green Strength (min.) | Viscosity (cp) | Quick Burst (psi) |
|---|---|---|---|---|---|---|---|---|---|---|---|---|---|---|
| 20 | 20 | 60 | 1 | 13 | 6 | | | | | 321 | 0.33 | 2 | 580 | 1650 PF |
| 21 | 20 | 60 | 1 | 13 | | 6 | | | | 362 | 0.33 | 1 | 245 | 1625 PF |
| 22 | 20 | 60 | 1 | 13 | | | 6 | | | 341 | 0.33 | 1 | 300 | >1400 PF |
| 23 | 25 | 50 | 1 | 15 | | | 9 | | | 355 | 0.50 | 2 | 1112 | 1800 PF |
| 24 | 25 | 50 | 1 | 14 | | 9 | | | | 281 | 0.50 | 2 | 1468 | 675 M |
| COMMERCIAL SOLVENT CEMENTS | | | | | | | | | | >400 | | 1–2 | 500– 3000 | >1400 PSI OR PIPE FAILURE |

[1]EA is ethyl acetate.
[2]PF means the pipe failed before the adhesive failed.

Examples 5 through 24 in Table 2 illustrate that solvent based adhesives having a DMA/NMP ratio of from 0.3 to 1.3 and having either a third minor solvent or combination of solvents which provide a minor portion (<10%) of the overall formulation will have a VOC level lower than 400 grams/liter and perform as well as existing commercial solvent based adhesive systems having a VOC level of 450 grams/liter or greater.

In these examples, the VOC levels are all below 300 g/l and the bond strength passes all enumerated criteria. Formulations 15, 16, 17, and 18 all would be commercially unacceptable due to the high viscosity, although still effective as adhesives.

TABLE 3

| Ex. | DMA | NMP | Silica | TempRite 677 x 670 CPVC | TempRite 674 x 571 CPVC | Cyclo-hexan-one | MEK | THF | EA | VOC (g/l) | Green Strength | Quick Burst(psi) | Viscosity (cp) | DMA/NMP Ratio |
|---|---|---|---|---|---|---|---|---|---|---|---|---|---|---|
| 25 | 20 | 60 | 1 | 13 | | | | | 6 | 363 | 2 | >1400 | 604 | 0.33 |
| 26 | 20 | 60 | 1 | | 13 | | | | 6 | 308 | 2 | >1400 | 1904 | 0.33 |
| 27 | 20 | 60 | 1 | 13 | | 6 | | | | 321 | 2 | 1650 PF | 580 | 0.33 |
| 28 | 20 | 60 | 1 | | 13 | 6 | | | | 274 | 2 | 785 PF | 1672 | 0.33 |
| 29 | 20 | 60 | 1 | 13 | | | 6 | | | 362 | 1 | 1625 PF | 245 | 0.33 |
| 30 | 20 | 60 | 1 | | 13 | | 6 | | | 314 | 1 | >1400 PF | 885 | 0.33 |
| 31 | 20 | 60 | 1 | 13 | | | | 6 | | 341 | 1 | >1400 PF | 300 | 0.33 |
| 32 | 20 | 60 | 1 | | 13 | | | 6 | | 337 | 1 | >1400 PF | 975 | 0.33 |
| COMMERCIAL SOLVENT CEMENTS | | | | | | | | | | >400 | 1–2 | >1400 PSI OR PIPE FAILURE | 500– 3000 | |

Examples 25 through 32 in Table 3 illustrate that low VOC solvent based adhesives having a DMA/NMP ratio of 0.3 and having a third minor solvent comprising <10% of the overall formulation will have a lower VOC level and the formulation will perform as well as existing commercial solvent based adhesives. Furthermore, if a lower molecular weight CPVC (e.g. Temprite® 677x670) resin is used in the formulation, the viscosity can be improved and the adhesive can perform better than existing solvent based adhesives.

TABLE 4

| Ex. | TempRite 674 x 571 CPVC | Silica | NMP | MEK | DMA | VOC (g/l) | Viscosity (cp) | Quick Burst (psi) | DMA/ NMP Ratio |
|---|---|---|---|---|---|---|---|---|---|
| 33 | 12 | 2 | 41 | 10 | 35 | 287 | 1460 | >1400 PF | 0.86 |
| 34 | 11.5 | 1.5 | 43 | 10 | 34 | 213 | 1200 | >1400 PF | 0.8 |
| 35 | 11.5 | 1.5 | 39 | 10 | 38 | 289 | 1325 | >1400 PF | 0.97 |
| 36 | 11.5 | 1.5 | 47 | 10 | 30 | 271 | 810 | >1400 PF | 0.64 |
| 37 | 13.5 | 1.5 | 43 | 10 | 32 | 274 | 1975 | >1400 PF | 0.74 |
| 38 | 13.5 | 1.5 | 50 | 8 | 27 | 201 | 1840 | >1400 PF | 0.54 |
| 39 | 13.5 | 1.5 | 48 | 8 | 29 | 243 | 1890 | >1400 PF | 0.6 |

TABLE 4-continued

| Ex. | Temp-Rite 674 × 571 CPVC | Silica | NMP | MEK | DMA | VOC (g/l) | Viscosity (cp) | Quick Burst (psi) | DMA/NMP Ratio |
|---|---|---|---|---|---|---|---|---|---|
| 40 | 10 | 2 | 44 | 10 | 34 | 252 | 610 | >1400 PF | 0.77 |
| 41 | 12.5 | 1.5 | 40 | 10 | 36 | 269 | 1950 | >1400 PF | 0.9 |
| 42 | 12.5 | 1.5 | 41 | 8 | 37 | 244 | 3305 | >1400 PF | 0.9 |
| 43 | 13.5 | 1.5 | 41 | 10 | 34 | 242 | 4210 | >1400 PF | 0.82 |

Examples 33 through 43 illustrate that solvent based adhesives having a DMA/NMP ratio from 0.54 to 0.97 and having MEK (2-butanone) as a minor component at a level less than 10% of the overall formulation will have a lower VOC level than commercial solvent based adhesives (with a VOC level of 450 grams/liter or greater) and will perform as well as these commercial solvent based adhesives.

Furthermore, Example 38 illustrates that a solvent based adhesive havin a DMA/NMP ratio less than 0.55 and having MEK (2-butanone) as a minor component at a level less than 8% of the overall formulation will have a VOC level of 201 grams/liter and will perform as well as conventional solvent based adhesives.

In the next example, Example 44, the following components were used:

50% NMP

30% DBE-6 (DMA)

5% butanone (MEK)

13% TempRite 674×571 CPVC Resin

2% Silica

| | PROPERTIES | |
|---|---|---|
| Substrates Joined | VOC on Various Substrates (g/l) | Quick Burst on Various Substrates (psi) |
| CPVC | 250 | 938-pipe failure |
| PVC | 168 | 1575-pipe failure |
| ABS | 169 | 375-pipe failure |

The VOC level of the solvent based adhesive system was measured using SCAQMD 316A; the quick burst was measured using ASTM D-1599. The following properties were obtained:

Sustained Long Term Hydrostatic Pressure at Elevated Temperature (150° F., 370 psi pipe pressure, 1000 hours minimum time) - ASTM D-2837
    1" assembly 1158 hours with no failure
    3" assembly 1315 hours with no failure
Viscosity (Brookfield): 2792 cps (Brookfield Viscometer Spindle 5 at 100 rpm)
Green Strenth: 2 min.
Lap Shear: 148 psi - UL 1821
Cure Times:

| | |
|---|---|
| at 73° F. | 7 min. |
| at 28° F. | 20 min. |
| at 0° F. (with acetone cleaning) | 45 min. |

Stress Crack Tendency after 20 hours dulling of the plaque noted
    after 202 hours swelling at the edges of the plaque noted.
    Test discontinued.

The stress cracking tendency of the samples referred to above is measured in the following manner. Samples having a dimension of 7 cm×3 mm×1.25 cm are prepared from compression molded plaques. These samples are inserted into a test fixture as described in FIG. 1 of the article "Stress Cracking Of Rigid Polyvinyl Chloride By Plasticizer Migration", *Journal of Vinyl Technology*, Dec. 1984, Vol. 6, No. 4. The samples are inserted into the fixture by use of a benchtop vise. The sample is placed at the edge of the vise with approximately half of its width extending beyond the edges of the vise. The vise is then used to bend the sample until its ends are close enough to slide it into the edge of the test fixture. After the sample is positioned into the test fixture, the low VOC solvent based adhesive is applied to the sample using a medicine dropper. The sample is removed periodically from the chemical to check for signs of cracking, crazing or discoloration. Testing is carried out until failure is observed.

In the following examples, the first organic liquid solvent in the examples was NMP. The second organic liquid solvent was chosen from the group consisting essentially of pimelic acid, monomethyl glutarate, monomethyl pimelate, monomethyl azelate, monomethyl sebacate, monoethyl adipate, dimethyl succinate, dimethyl glutarate, dimethyl adipate, dimethyl pimelate, dimethyl substrate, dimethyl azelate, glutaryl chloride, adipoyl chloride, and pimeloyl chloride, or mixtures thereof. The VOC level, the green strength and the quick burst were measured for each combination, as set forth in Table 5.

TABLE 5

| Ex. | Component | Amount | NMP | Silica | TempRite 674 × 571 CPVC Resin | VOC (g/l) | Green Strength (min) | Quick Burst (psi) |
|---|---|---|---|---|---|---|---|---|
| 45 | Pimelic Acid | 19.5 | 72.9 | 1.4 | 6.2 | 283 | 1 | 1375 F |
| 46 | Monomethyl | 27 | 62 | 2 | 9 | 253 | 1 | 1200 F |

TABLE 5-continued

| Ex. | Component | Amount | NMP | Silica | TempRite 674 × 571 CPVC Resin | VOC (g/l) | Green Strength (min) | Quick Burst (psi) |
|---|---|---|---|---|---|---|---|---|
| 47 | Monomethyl pimelate | 25 | 65.6 | 1.9 | 7.5 | 158 | 1 | 1150 F |
| 48 | Monomethyl azelate | 40 | 45 | 3 | 12 | 121 | 3 | >1400 gel |
| 49 | Monomethyl sebacate | 40 | 45 | 3 | 12 | 137 | 3 | >1400 gel |
| 50 | Monoethyl adipate | 30.8 | 57.7 | 2.3 | 9.2 | 179 | 3 | 1000 F |
| 51 | Dimethyl succinate | 40 | 45 | 3 | 12 | 341 | | |
| 52 | Dimethyl glutarate | 40 | 45 | 3 | 12 | 289 | | |
| 53 | Dimethyl adipate | 40 | 45 | 3 | 12 | 152 | | |
| 54 | Dimethyl pimelate | 40 | 62 | 2 | 9 | 241 | 1 | 1450 F |
| 55 | Dimethyl suberate | 40 | 45 | 3 | 12 | 77 | 2 | >1400 |
| 56 | Dimethyl azelate | 40 | 45 | 3 | 12 | 114 | 2 | >1400 |
| 57 | Glutrayl Chloride | 27 | 62 | 2 | 9 | 197 | 1 | 1175 P |
| 58 | Adipoyl Chloride | 27.6 | 62.1 | 2.1 | 8.3 | 83 | 2 | 1400 F |
| 59 | Pimeloyl Chloride | 27 | 62 | 2 | 9 | 178 | 2 | 1100 F |

The data in this Table 5 shows that when the NMP is used in combination with one of the enumerated second organic liquid solvents, an adhesive composition is obtained with adequate properties.

The three Examples set forth below deal with the measurement of the flash point of the novel low VOC solvent based adhesive of the instant invention. The flash point of the compositions was measured on the Erdco Rapid Tester, Model RT-1, in accordance with ASTM D 3828-87. The following results were obtained.

COMPOSITION A 13.5% TempRite 674×571 CPVC Resin
1.5% Silica
27% DMA
58% NMP
Flash Point: 203° F.
VOC level of 153 g/l as measured by SCASQMD 316A

COMPOSITION B 13.5% TempRite 674×571 CPVC Resin
1.5% Silica
27% DMA
50% NMP
8.0% 5-methyl-2-hexanone (CAS #110-12-3) available from the Aldrich Chemical Co.
Flash Point: 167° F.
VOC level of 240 g/l as measured by SCAQMD 316A

COMPOSITION C 13.5% TempRite 674×571 CPVC Resin
1.5% Silica
27% DMA
50% NMP
8% 4-methyl-2-pentanone (CAS #108-10-1) available from the Aldrich Chemical Co.
Flash Point: 131° F.
VOC level of 215 g/l as measured by SCAQMD 316A In contradistinction, the flash points of the following commercial one step and two step solvent cements was obtained:

Standard Oatey One Step "Low VOC" Solvent Cement: Fp: −20° C. or −4° F.
Standard Oatey Two Step Solvent Cement: Fp: −15° C. or +5° F.
Neat Tetrahydrofuran: −17° C. or 1° F.
Neat Cyclohexanone: 67° C. or 154° F.
Neat MEK (2-butanone): −3° C. or 26° F.

The following examples in Table 6 illustrate how substituted naphthalenes with 11 to 14 carbon atoms and/or substituted benzenes with from 10 to 14 carbon atoms can be used in place of NMP in the low VOC solvent based and result in low VOC values according to SCAQMD 316A (e.g. as low as 73 g/L) and meet the physical property tests of a solvent based adhesive. The examples with 8 weight percent MEK have less desirable flash points than the other examples using ketones with higher flash points. The addition of ketones tends to lower the time required for green strength but increase the VOC. The particular ester of a dicarboxylic acid and methyl alcohol (DBE-6) could be substituted with other such esters as shown in Table 5 with NMP as the primary solvent. The methyl naphthalene used in the experiment was >95 weight percent purity. The SS-150 was a Sure Sol® which is 98 weight percent $C_{10}$ isomers of benzene and the SS-150 ND was similar to SS-150 but naphthalene depleted. Both the SS-150 and 150

ND are available as petroleum distillate fractions from Koch Specialty Chemical Group in Corpus Christi, Tex.

TABLE 6

| Ex. | CPVC[1] Resin wt. % | Silica[3] wt. % | NMP wt. % | mNaph wt. % | SS-150 wt. % | SS-150 ND wt. % | DBE-6[4] wt. % | MEK wt. % | MIAK wt. % | MIBK wt. % |
|---|---|---|---|---|---|---|---|---|---|---|
| 707  | 13.5[1] | 1.5 | 50 | —  | —  | —  | 27 | 8 | —  | —  |
| 707A | 13.5[1] | 1.5 | 58 | —  | —  | —  | 27 | — | —  | —  |
| 707B | 13.5[1] | 1.5 | 50 | —  | —  | —  | 27 | — | 8  | —  |
| 707C | 13.5[1] | 1.5 | 50 | —  | —  | —  | 27 | — | —  | 8  |
| 233  | 10[2]   | 0   | —  | 53 | —  | —  | 29 | 8 | —  | —  |
| 234  | 10[2]   | 0   | —  | 53 | —  | —  | 29 | — | 8[+2] | —  |
| 235  | 10[2]   | 0   | —  | 53 | —  | —  | 29 | — | —  | 8[+2] |
| 236  | 10[2]   | 0   | —  | 61 | —  | —  | 29 | — | —[+4] | —  |
| 247  | 82      | 0   | —  | —  | 54 | —  | 30 | — | 8[+2] | —  |
| 248  | 82      | 0   | —  | —  | 54 | —  | 30 | — | —  | 8  |
| 250  | 82      | 0   | —  | —  | —  | 54 | 30 | — | 8[+2] | —  |
| 251  | 82      | 0   | —  | —  | —  | 54 | 30 | — | —  | 8  |

| Ex. | VOC g/L[5] | Viscosity CP | Green Strength | 55/psi Hydro Burst 0.10 hr., 551 psi | Hydro Burst 4 hr., 403 psi | Flash Point °F.[6] | Hydro Burst 2 in DIA 180° F.[7] | Shelf Stability 120° F. 30 days | Meets ASTM 493 |
|---|---|---|---|---|---|---|---|---|---|
| 707  | 172 | 1728 | 2 | FAIL .07 HR | FAIL 3.92 HR | 86  | PASS | FAIL | FAIL |
| 707A | 72  | 1662 | 3 | PASS | PASS | 203 | PASS | FAIL | PASS |
| 707B | 97  | 1373 | 3 | PASS | PASS | 167 | PASS | FAIL | PASS |
| 707C | 73  | 1407 | 3 | PASS | PASS | 131 | PASS | FAIL | PASS |
| 233  | 305 | 1218 | 3 | —   | —   | 77  | PASS | PASS | —   |
| 234  | 189 | 6753 | 3 | PASS | PASS | 167 | PASS | PASS | PASS |
| 235  | 229 | 8518 | 2 | PASS | FAIL 2.64 HR | 131 | PASS | PASS | FAIL |
| 236  | 128 | 1830 | 4 | —   | —   | 230 | PASS | PASS | —   |
| 247  | 300 | 2880 | 2 | PASS | PASS | 149 | PASS | PASS | PASS |
| 248  | 308 | 191  | 2 | PASS | FAIL 2.28 HR | 122 | PASS | PASS | FAIL |
| 250  | 369 | 3790 | 1 | PASS | PASS | 140 | PASS | PASS | PASS |
| 251  | 414 | 1300 | 2 | —   | —   | 122 | PASS | PASS | —   |

[1]Chlorinated polyvinyl chloride having 67.3 weight percent Cl and an inherent viscosity of 0.92.
[2]Chlorinated polyvinyl chloride having 67.0 weight percent Cl and an inherent viscosity of 0.68.
[3]Fumed Silica available from Aldrich.
[4]Dimethyl adipate available from DuPont under the tradename DBE-6 NMP is N-methyl-2-pyrrolidone, MEK is methyl ethyl ketone, MIAK is methyl-iso-amyl ketone, MIBK is methyl-isobutyl ketone. m-Naph is methyl naphthalene. The flash point of the ketones are 24, 10, and 73° F. according to the Merck Index, 10th Ed.
[5]VOC is volatile organic compounds as determined by SCAQMD 316A.
[6]As determined by ASTM D3828-87
[7]ASTM 493. See also ASTM D1598-86 and D1599-88.

While all of the above examples of the invention did not individually pass all of the tests (e.g. examples 235 and 248 failed the 4 hr. 403 psi hydroburst test), the examples as a whole teach and suggest how to modify the deficient performance to achieve the desired properties. Example 234 teaches that MIAK instead of MIBK in example 235 would achieve the desired property. Example 247 when compared to 248 teaches a similar change. Other slight changes in the solvent blend (MIAK and MIBK vary only by one carbon atom per molecule) are anticipated to also compensate for deficient performance and thus total performance can be optimized by routine experimentation.

In summary, a novel and unobvious low VOC solvent based adhesive has been described as well as the process of applying such low VOC solvent based adhesive to two thermoplastic materials that are going to be joined together. Said adhesive desirably has a flash point over 100° F. as measured by ASTM D3828-87. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A solvent based adhesive, comprising:
   a) from about 38 to about 75 weight percent of a first solvent being at least one alkyl substituted naphthalene having 1 or more alkyl groups and from 11 to 14 carbon atoms, or at least one alkyl substituted benzene having 1 or more alkyl groups and from 10 to 14 carbon atoms, or combinations thereof, and optionally including a portion of N-methyl-2-pyrrolidone, wherein said at least one alkyl substituted naphthalene and/or said at least one alkyl substituted benzene is present in an amount of at least 5 weight percent;
   b) from about 5 to about 20 weight percent of a thermoplastic resin; and
   c) from about 5 to about 47 weight percent of an additional one or more solvents,
   wherein the volatility and the amount of said additional one or more solvents are controlled to keep the volatile organic content of said solvent based adhesive as measured by South Coast Air Quality Management District (SCAQMD) Test Method 316A below 450 grams/liter and wherein the weight percent values are based upon the weight of said solvent based adhesive.

2. A solvent based adhesive according to claim 1, with the proviso that a total amount of any of said additional one or more solvents which have a flash point below 100° F. as measured by ASTM D3828-87 is less than 10 weight percent and wherein the volatile organic content by Test Method 316A is below 350 g/l.

3. A solvent based adhesive according to claim 2, with the proviso that a total amount of any of said one or more solvents which have a flash point below 50° F. is less than 5 weight percent.

4. A solvent based adhesive according to claim 1, wherein said thermoplastic resin comprises polyvinyl chloride, chlorinated polyvinyl chloride, acrylonitrile-butadiene-styrene (ABS), or polystyrene, and wherein said first solvent is present in an amount from about 38 to about 65 weight percent.

5. A solvent based adhesive according to claim 4, wherein said thermoplastic resin is present in an amount from about 5 to about 15 weight percent.

6. A solvent based adhesive according to claim 4, wherein said adhesive comprises from about 5 to about 20 weight percent of chlorinated polyvinyl chloride.

7. A solvent based adhesive according to claim 6, wherein said adhesive comprises from about 10 to about 13.5 weight percent chlorinated polyvinyl chloride.

8. A solvent based adhesive according to claim 1, wherein said at least one alkyl substituted naphthalene and/or alkyl substituted benzene is present in an amount from about 20 to about 65 weight percent.

9. A solvent based adhesive according to claim 8, wherein said at least one alkyl substituted naphthalene and/or alkyl substituted benzene is present in an amount from about 38 to about 65 weight percent.

10. A solvent based adhesive according to claim 9, wherein said the volatile organic content by Test Method 316A is below 350 g/l.

11. A solvent based adhesive according to claim 9, wherein the volatile organic content by Test Method 316A is below 250 g/l.

12. A solvent based adhesive according to claim 9, wherein said thermoplastic resin comprises from about 5 to about 20 weight percent of chlorinated polyvinyl chloride.

13. A solvent based adhesive according to claim 11, wherein said adhesive comprises from about 5 to about 20 weight percent chlorinated polyvinyl chloride.

14. A solvent based adhesive according to claim 4, wherein said additional one or more solvents comprises from about 10 to about 35 weight percent of one or more aliphatic polycarboxylic acids having a total of 4 to 15 carbon atoms, mono or dialkyl esters thereof having a total of 4 to 19 carbon atoms, alkyl chlorides of said polycarboxylic acids having a total of 4 to 17 carbon atoms, chlorides of said polycarboxylic acids having a total of 4 to 15 carbon atoms or combinations thereof.

15. A solvent based adhesive according to claim 14, wherein said additional one or more solvents comprises from about 25 to about 35 weight percent of said one or more mono or dialkyl esters of polycarboxylic acids and/or chlorides of said polycarboxylic acids or combinations thereof.

16. A solvent based adhesive according to claim 15, wherein said additional one or more solvents further includes from about 5 to about 10 weight percent of one or more ketones based upon the weight of said solvent based adhesive.

17. A solvent based adhesive according to claim 16, wherein said one or more ketones consist essentially of ketones having a flash point above 70° F. by ASTM D3828-87.

18. A solvent based adhesive according to claim 16, wherein said thermoplastic resin is present in an amount from about 5 to about 20 weight percent.

19. A solvent based adhesive according to claim 18, wherein said adhesive comprises from about 5 to about 20 weight percent chlorinated polyvinyl chloride.

20. A solvent based adhesive according to claim 18, wherein said adhesive comprises from about 10 to about 13.5 weight percent chlorinated polyvinyl chloride.

21. A solvent based adhesive according to claim 20, wherein said at least one alkyl substituted naphthalene and/or alkyl substituted benzene is present in an amount from about 38 to about 65 weight percent.

22. A solvent based adhesive according to claim 14, wherein the volatile organic content by Test Method 316A is below 350 g/l.

23. A solvent based adhesive according to claim 14, wherein the volatile organic content by Test Method 316A is below 250 g/l.

24. A solvent based adhesive, comprising:
a) from about 38 to about 70 weight percent of at least one alkyl substituted naphthalene having from 11 to 14 carbon atoms and/or alkyl substituted benzene having at least 1 alkyl groups and from 10 to 14 carbon atoms,
b) from about 5 to about 20 weight percent of a chlorinated polyvinyl chloride.
c) from about 10 to about 35 weight percent of one or more aliphatic poly carboxylic acids having a total of 4 to 15 carbon atoms, mono or dialkyl esters thereof, having a total of 4 to 19 carbon atoms, alkyl chlorides of said polycarboxylic acids having a total of 4 to 17 carbon atoms, chlorides of said polycarboxylic acids having a total of 4 to 15 carbon atoms or combinations thereof,
d) optionally from about 5 to about 10 weight percent of one or more ketones, said adhesive having a volatile organic content by Test Method 316A of less than 450 g/l.

25. A solvent based adhesive according to claim 24, having a volatile organic content by Test Method 316A of below 350 g/l.

26. A solvent based adhesive according to claim 25, having a volatile organic content by Test Method 316A of below 250 g/l.

27. A solvent based adhesive according to claim 24, wherein said one or more ketones includes from about 5 to about 10 weight percent of ketones having a flash point above 70° F. by ASTM D3828-87.

* * * * *